United States Patent
Nakajima

(10) Patent No.: US 11,386,313 B2
(45) Date of Patent: Jul. 12, 2022

(54) IMAGE FORMATION CONTROL APPARATUS, IMAGE FORMATION CONTROL METHOD AND NON-TRANSITORY COMPUTER-READABLE STORAGE MEDIUM STORING IMAGE FORMATION CONTROL PROGRAM

(71) Applicant: KYOCERA Document Solutions Inc., Osaka (JP)

(72) Inventor: Naoki Nakajima, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/371,213

(22) Filed: Jul. 9, 2021

(65) Prior Publication Data
US 2022/0012554 A1    Jan. 13, 2022

(30) Foreign Application Priority Data
Jul. 10, 2020    (JP) .............................. JP2020-119155

(51) Int. Cl.
| G06F 3/12 | (2006.01) |
| G06F 15/00 | (2006.01) |
| G06K 1/00 | (2006.01) |
| G06K 15/02 | (2006.01) |

(52) U.S. Cl.
CPC ....... *G06K 15/1878* (2013.01); *G06F 3/1208* (2013.01); *G06F 3/1241* (2013.01)

(58) Field of Classification Search
CPC .. G06K 15/1878; G06F 3/1208; G06F 3/1241
See application file for complete search history.

(56) References Cited

U.S. PATENT DOCUMENTS

| 5,793,886 A * | 8/1998 | Cok .......................... H04N 5/21 348/700 |
| 2007/0133722 A1* | 6/2007 | Agazzi .............. H04L 25/03057 375/233 |
| 2009/0034838 A1* | 2/2009 | Umeda .................. H04N 1/628 382/167 |

FOREIGN PATENT DOCUMENTS

| JP | H10-145626 | 5/1998 |
| JP | 2019-103093 | 6/2019 |

* cited by examiner

*Primary Examiner* — Moustapha Diaby
(74) *Attorney, Agent, or Firm* — Lex IP Meister, PLLC

(57) ABSTRACT

The image formation control apparatus controls an image forming device to execute image forming on an image forming medium based on input image data by using a plurality of color materials including a plurality of chromatic color materials. An image formation control apparatus comprising: a table generating unit to generate a visibility improvement color table by performing color conversion into intermediate image data, performing histogram equalization processing on a brightness gradation value representing brightness of an image represented by the intermediate image data, and adjusting the brightness gradation value representing brightness of the intermediate image data; and an image formation control unit to generate an image forming job for performing the color conversion using the generated color table to form an image on an image forming medium.

8 Claims, 8 Drawing Sheets

RGB COLOR SPACE

RGB COLOR SPACE (GRAY AXIS DIRECTION)

BEFORE NON-DIVIDED HISTOGRAM EQUALIZATION PROCESSING (LOW LIGHTNESS, LARGE VARIANCE)

AFTER NON-DIVIDED HISTOGRAM EQUALIZATION PROCESSING (LOW LIGHTNESS, LARGE VARIANCE)

IMAGE HISTOGRAM
(HIGH LIGHTNESS, SMALL VARIANCE)

DIVIDED HISTOGRAM EQUALIZATION PROCESSING
(HIGH LIGHTNESS, SMALL VARIANCE)

IMAGE FORMATION CONTROL APPARATUS, IMAGE FORMATION CONTROL METHOD AND NON-TRANSITORY COMPUTER-READABLE STORAGE MEDIUM STORING IMAGE FORMATION CONTROL PROGRAM

INCORPORATION BY REFERENCE

This application is based upon and claims the benefit of priority from the corresponding Japanese Patent Application No. 2020-119155 filed on Jul. 10, 2020, the entire contents of which are incorporated herein by reference.

BACKGROUND

The present disclosure relates to an image formation control apparatus, an image formation control method, and a non-transitory computer-readable storage medium storing an image formation control program and particularly relates to color conversion processing.

An image forming apparatus generally performs color conversion using an output profile in order to reproduce an image using a plurality of color materials (for example, CMYK color materials) including a plurality of chromatic color materials. The output profile defines a color space reproducible by subtractive color mixing of color materials in the image forming apparatus. Since an output color space that can be reproduced by subtractive color mixing is generally narrower than an input color space that can be reproduced by additive color mixing, a technique called gamut mapping is employed to compress the color space into a color space that can be reproduced by an image forming apparatus. Typically, gamut mapping compresses a color difference based on geometric rules while preserving hue and luminance in the Lch color space, which is designed to equalize color differences in human visual sensitivity.

As a method of gamut mapping, there has been proposed a technique capable of excellently reproducing lightness, chroma, and hue of a portion to which a person pays attention in an image such as a memory color, securing gradation characteristics and linearity of hue of the entire image, and realizing excellent color reproduction characteristics without causing collapse of a high chroma portion. In consideration of the human visual characteristic that the contrast sensitivity of the high-frequency component in the luminance/lightness component is high, there is proposed a technique for suppressing the occurrence of a false contour appearing as an inappropriate line by correcting the lightness L in which the contrast sensitivity of the high-frequency component is relatively high among the lightness L and the chromaticity ab. As a result, it is possible to avoid deterioration of the gradation and the change of the color tone which may occur when the gamut mapping is performed, and to improve the gradation more favorably.

SUMMARY

An image formation control apparatus of the present disclosure uses a plurality of color materials including a plurality of chromatic color materials and executes image forming on an image forming medium based on input image data. The image formation control apparatus includes a table generating unit and an image formation control unit. The table generating unit performs color conversion on input image data to convert the input image data into intermediate image data that is image data in an absolute color space. Histogram equalization processing is executed for a brightness gradation value representing brightness of an image represented by the intermediate image data. The brightness gradation value representing brightness of the intermediate image data is adjusted based on the executed histogram equalization processing. A visibility improvement color table for color-converting the intermediate image data whose gradation value is adjusted into color material gradation data having a color material gradation value representing each density of the plurality of color materials in a reproduction color space reproducible by the plurality of color materials is generated. The image formation control unit executes the color conversion using the generated color table, and generates an image forming job for executing image forming on an image forming medium based on the color material gradation data.

An image formation control method according to an embodiment of the present disclosure controls an image forming apparatus to form an image on an image forming medium based on input image data using a plurality of color materials including a plurality of chromatic color materials. The image formation control method includes table generation and image formation control. In the table generation, the input image data is color-converted into intermediate image data which is image data in an absolute color space. Histogram equalization processing is executed for a brightness gradation value representing brightness of an image represented by the intermediate image data. A brightness gradation value representing brightness of the intermediate image data is adjusted based on the executed histogram equalization processing. A visibility improvement color table for color-converting the intermediate image data whose gradation value is adjusted into color material gradation data having a color material gradation value representing each density of the plurality of color materials in a reproduction color space reproducible by the plurality of color materials is generated. The image formation control executes the color conversion using the generated color table, and generates an image forming job for executing image forming on an image forming medium based on the color material gradation data.

A non-transitory computer-readable storage medium storing an image formation control program according to an embodiment of the present disclosure controls an image formation control apparatus that controls an image forming apparatus to form an image on an image forming medium based on input image data using a plurality of color materials including a plurality of chromatic color materials. The image formation control program includes a table generating unit and an image formation control unit. The table generating unit performs color conversion on the input image data to convert the input image data into intermediate image data that is image data in an absolute color space. Histogram equalization processing is executed for a brightness gradation value representing brightness of an image represented by the intermediate image data. A brightness gradation value representing brightness of the intermediate image data is adjusted based on the executed histogram equalization processing. A visibility improvement color table for color-converting the intermediate image data whose gradation value is adjusted into color material gradation data having a color material gradation value representing each density of the plurality of color materials in a reproduction color space reproducible by the plurality of color materials is generated. The image formation control unit executes the color conversion by using the generated color table. An image forming job for executing image forming on an image forming medium is generated based on the color material gradation data.

DETAILED DESCRIPTION

Hereinafter, embodiments of the present disclosure will be described with reference to the drawings.

Figure 1:
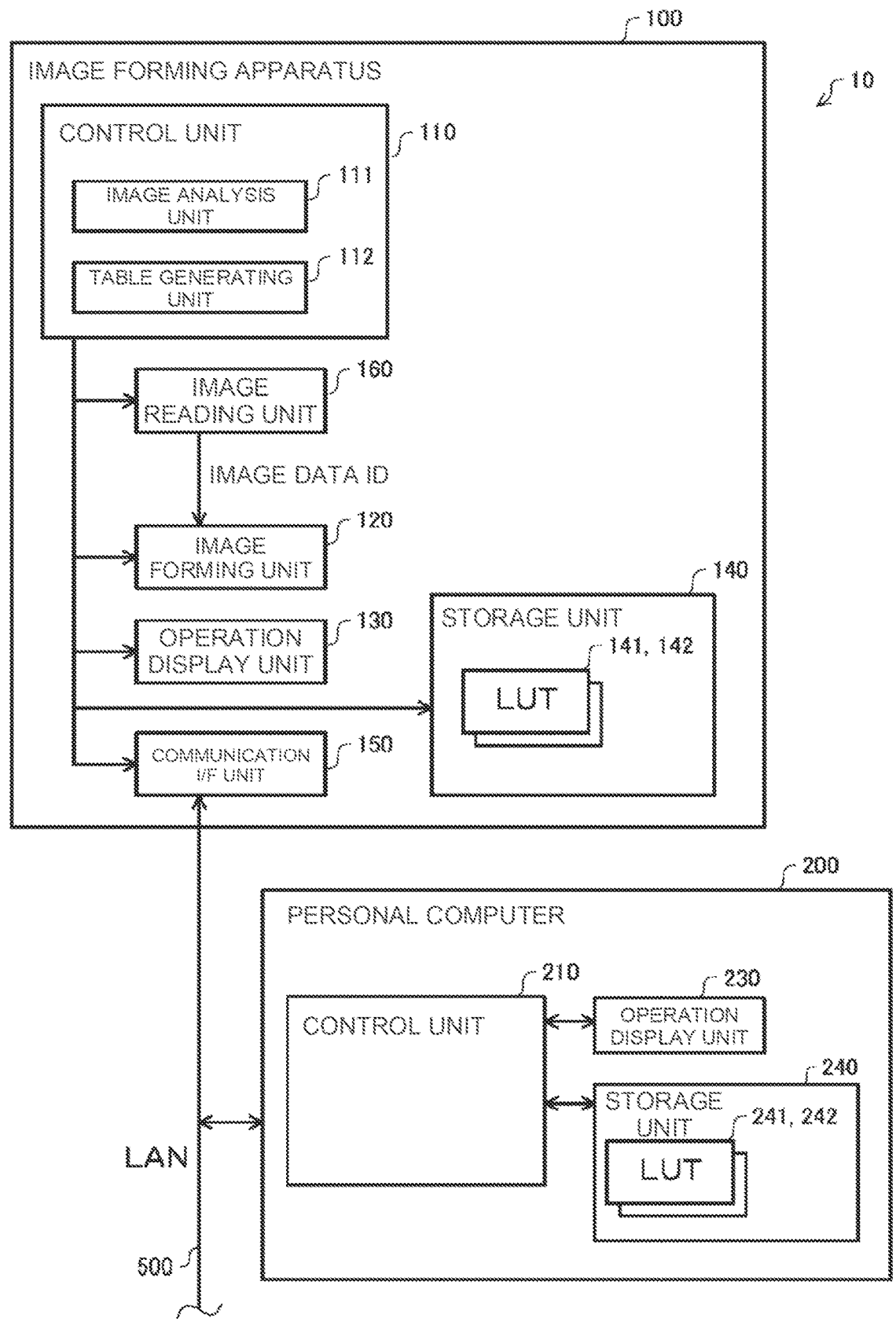
FIG. 1 is a schematic configuration diagram configuration of an entire image forming system 10 according to an embodiment of the present disclosure.

FIG. 1 is a schematic configuration diagram configuration of an entire image forming system 10 according to an embodiment of the present disclosure. The image forming system 10 includes an image forming apparatus 100, a personal computer 200, and a local area network (also simply referred to as a LAN) 500 that connects the image forming apparatus 100 and the personal computer 200.

The image forming apparatus 100 includes a control unit 110, an image forming unit 120, an operation display unit 130, a storage unit 140, a communication interface unit (also referred to as a communication I/F) 150, and an image reading unit 160. The operation display unit 130 receives a user operation input (also simply referred to as a user input) from a display functioning as a touch panel, various buttons, and switches (not illustrated). The image forming apparatus 100 can receive selection of, for example, a contrast enhancement mode (described later) via the operation display unit 130.

The image reading unit 160 reads an image from a document, generates an image data ID that is RGB image data, and transmits the image data ID to the image forming unit 120. The RGB image is device-dependent (dependent on the image reading unit 160). The control unit 110 includes an image analysis unit 111 and a table generating unit 112. The functions of the image analysis unit 111 and the table generating unit 112 will be described later.

The image reading unit 160 has characteristics defined by the input profile. When the input profile is used, the image data ID which is device-dependent RGB image data can be converted into Lch image data which is image data in the Lch color space (or Lab color space). Accordingly, the image forming apparatus 100 can convert the image data into, for example, RGB image data via the Lch color space and output the RGB image data as scan data.

The image forming unit 120 has characteristics defined by the output profile. By using the output profile, the Lch image data can be converted into CMYK image data, which is image data in the CMYK color space. The characteristics of the image forming unit 120 can be simulated by a simulation profile. By using the simulation profile, the CMYK image data can be converted into the Lch image data. The input profile, the output profile and the simulation profile are configured as a look-up table (LUT) 141, 142. The CMYK image is color material gradation data having color material gradation values representing densities of a plurality of color materials (for example, CMYK).

The image forming apparatus 100 has a device link profile in which an input profile and an output profile are combined. The device link profile can improve the printing speed by reducing the load of the color conversion processing in the copying processing. It should be noted that the output profile and the simulation profile have an irreversible relationship. That is, when the Lch image data is converted into the CMYK image data using the output profile and the CMYK image data is converted into the Lch image data using the simulation profile, a color difference occurs between the Lch image data before and after the conversion due to the characteristics of the image forming unit 120.

At the time of copying, the image forming unit 120 converts the RGB image data using the device link profile to generate CMYK image data. The CMYK image is device-dependent (depending on the image forming unit 120) for reproducing an image with CMYK color materials available in the image forming unit 120. The image forming unit 120 performs RIP processing on the CMYK image data to generate dot data that is bitmap data. The dot data is data representing a forming state of dots formed by the CMYK inks. The color material is not limited to CMYK, and a plurality of other color materials (for example, CMYKlclm, CMYK+Orange+Green, or the like) may be used.

The image forming unit 120 forms an image on a print medium (not illustrated) based on the dot data and discharges the print medium. In this example, it is assumed that an image is formed on a print medium (not illustrated) based on a print job (also referred to as an image forming job) received from the personal computer 200 and the print medium is discharged. The dot data is bitmap data representing a dot forming state on the print medium. The print medium is also referred to as an imaging medium.

The personal computer 200 includes a control unit 210, an operation display unit 230, and a storage unit 240. The operation display unit 230 has characteristics defined by a monitor profile and receives user operation input (also simply referred to as user input) from a display functioning as a touch panel or various buttons or switches (not illustrated).

The control units 110 and 210 include main storage units such as RAM and ROM, and control units such as MPU (Micro Processing Unit) and CPU (Central Processing Unit). The control units 110 and 210 have controller functions related to interfaces such as I/O, USB (universal serial bus), bus, and other hardware, and control the entire image forming apparatus 100 and personal computer 200, respectively.

The storage units 140 and 240 are storage devices including a hard disk drive, a flash memory, and the like as non-transitory recording media, and store image formation control programs and data executed by the control unit 110 and the like. The storage unit 140 stores a standard color table 141 and an adjusted color table 142. The standard color table 141 is a color table (input profile, output profile, and simulation profile) prepared in advance. The adjusted color table 142 is a color table (input profile, output profile, and simulation profile) adjusted to improve the visibility of the output image. The force profile is also referred to as a visibility enhancement color table.

The storage unit 240 stores an ICC profile (monitor profile: not illustrated) for display of the operation display unit 230, and an output profile and a simulation profile (lookup table (LUT) 241, 242)) of the image forming apparatus 100. The lookup table (LUT) 241, 242 includes a standard color table 241 and an adjusted color table 142. In this example, each lookup table (LUT) 241, 242 is identical to the lookup table (LUT) 141, 142 except for the monitor profile.

Figure 2A:
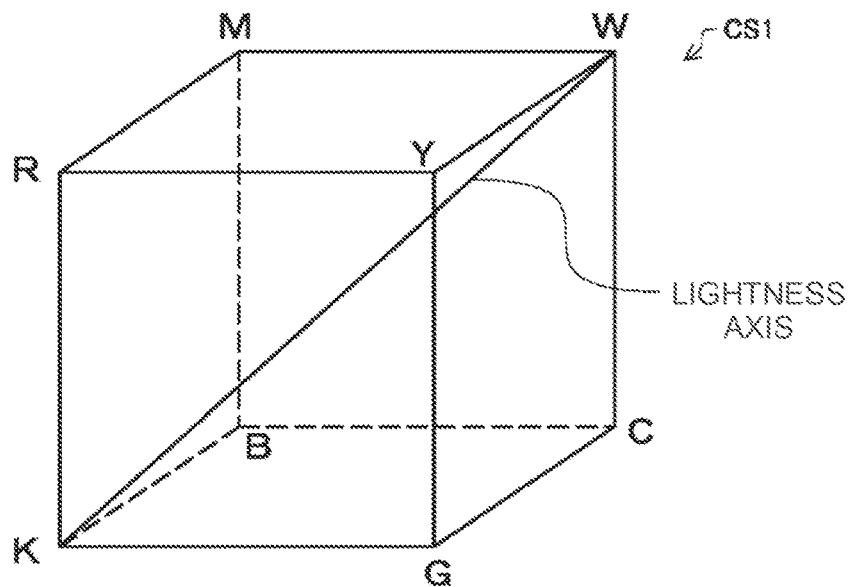
FIGS. 2A and 2B are an explanatory diagram illustrating content of an input color space according to an embodiment.
Figure 2B:
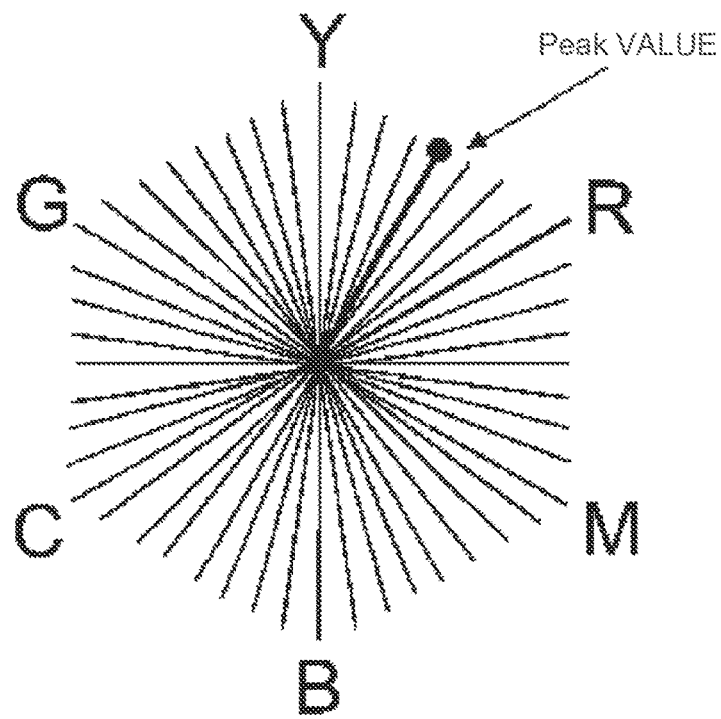

FIGS. 2A and 2B are an explanatory diagram illustrating the content of the input color space CS1 according to the embodiment. FIG. 2A illustrates an RGB color space described in a cubic manner as an input color space. FIG. 2B is a view illustrating the RGB color space described in a cubic manner as viewed in the direction from W (white) to K (black) of the lightness axis. The lightness axis is also called the gray axis because it represents only the lightness of an achromatic color.

As illustrated in FIG. 2A, the input color space CS1 has an R-axis extending from the vertex K (black) to the vertex R (red), a G-axis extending from the vertex K (black) to the vertex G (green), and a B-axis extending from the vertex K (black) to the vertex B (blue). The input color space CS1 stores 256 gradation RGB data of 0 to 255 in each RGB axis.

In the input color space CS1, as illustrated in FIG. 2B, peaks (Peak values) of 48 equal hue planes including R (red), Y (yellow), G (green), C (cyan), B (blue), and M (magenta) hue planes and hues between them are stored in hue angles. In the input color space CS1, colors having chroma corresponding to the distance in the radial direction from the center point (corresponding to the lightness axis) of FIG. 2B to the peak value (maximum chroma value) are stored.

Figure 3:
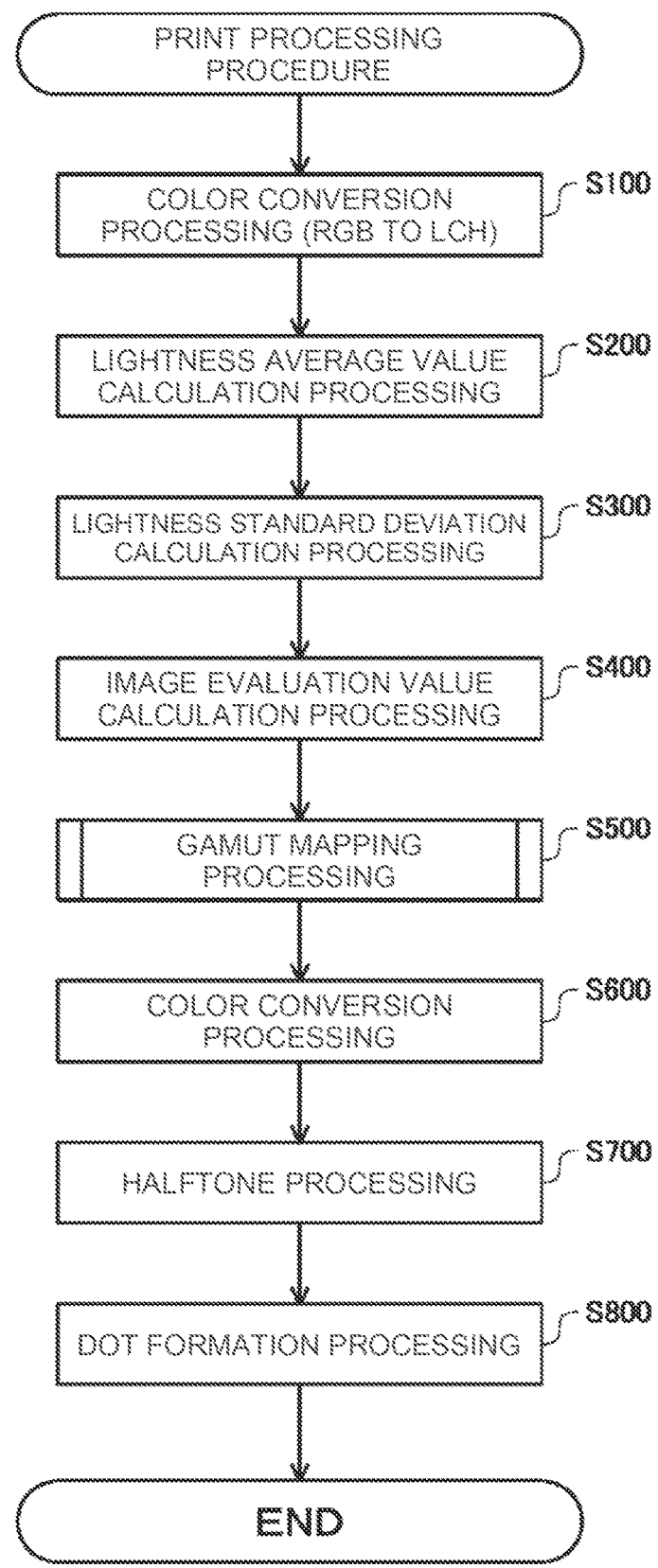
FIG. 3 is a flowchart illustrating the content of the print processing procedure according to the embodiment.

FIG. 3 is a flowchart illustrating the content of the print processing procedure according to the embodiment. The print processing procedure is characterized in that, so as to improve the reproducibility of the visibility the standard color table 141 is adjusted to produce an adjusted color table 142, and the adjusted color table 142 is used conversion is performed using the adjusted color table. The standard color table 141 is a color table that is commonly used regardless of the content of input image data without performing processing such as contrast enhancement for improving visibility.

As a result, the present print processing procedure can realize, for example, suppression of reduction in visibility of a printed image which may be deteriorated as compared with a display image, or improvement in visibility of a printed image in printing of image data representing an original image with poor visibility. The present print processing procedure is started in response to generation or reception of a print job including, for example, RGB image data (an example of input image data) and a command for improving visibility. Such a print job is generated or received in response to a user input such as a setting for improving the visibility (e.g. contrast enhancement mode) via the operation display unit 130 or the operation display unit 230 of the personal computer 200 at the time of copying.

In step S100, the control unit 110 functions as a color conversion processing unit and performs color conversion processing from the RGB color space to the Lch color space using a standard color table 141 which is a color table prepared in advance. Specifically, the control unit 110 converts RGB image data, which is image data in the RGB color space, into Lch image data (an example of intermediate image data), which is image data in the Lch color space. The Lch color space is a color space composed of lightness L, chroma C, and hue H.

Figure 4:
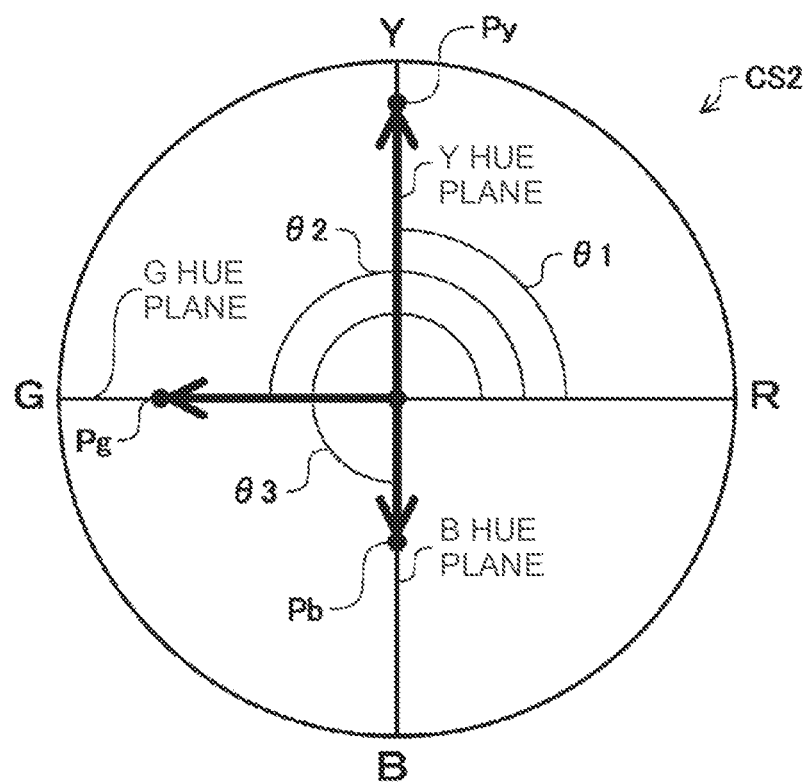
FIG. 4 is an explanatory diagram illustrating an Lch color space used in gamut mapping according to an embodiment.

FIG. 4 is an explanatory diagram illustrating the Lch color space used in gamut mapping according to an embodiment. FIG. 4 illustrates the hue and chroma in the Lch color space in polar coordinates. In this example, it is assumed that the output color space CS2 quantizes the hue in the Lch color space by 48 hue planes as an example, and is defined by hue planes having hue angles of 0 degrees, 7.5 degrees, 15 degrees, and 22.5 degrees to 352.5 degrees from the R hue plane. The output color space CS2 is a color space that can be reproduced by subtractive color mixing using CMYK color materials. In this example, it is assumed that the Lch color space and the CMYK color space have N (N is a natural number) lattice points corresponding to each other.

In step S200, the image analysis unit 111 of the control unit 110 executes the lightness average value calculation processing. In the lightness average value calculation processing, the image analysis unit 111 can calculate an average value of the lightness L of all the pixels, that is, calculate an average value by adding lightness values of all the pixels and dividing the sum by the number of pixels.

In step S300, the image analysis unit 111 of the control unit 110 executes lightness standard deviation calculation processing. In the lightness standard deviation calculation processing, the image analysis unit 111 can calculate the standard deviation by calculating the mean square of the difference between the lightness value of each pixel and the average value, calculating the variance, and taking the positive square root of the variance.

In step S400, the image analysis unit 111 of the control unit 110 executes image evaluation value calculation processing. In the image evaluation value calculation processing, the image analysis unit 111 calculates the image evaluation value E as a value obtained by dividing the average value of the lightness L by the standard deviation of the lightness L (=average value of the lightness L/standard deviation of the lightness L). In step S500, the table generating unit 112 of the control unit 110 executes the gamut mapping processing to generate the adjusted color table 142.

Figure 5:
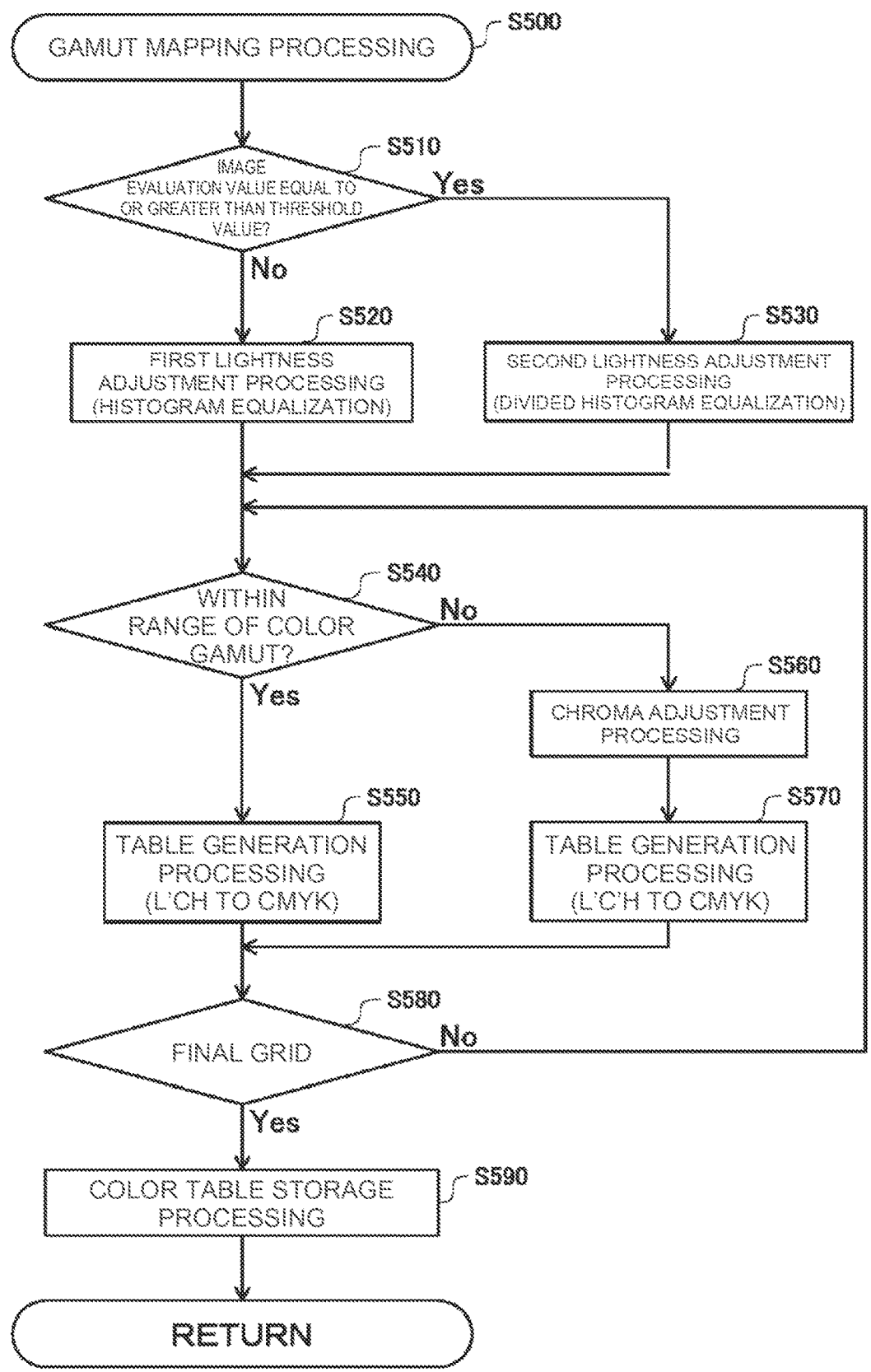
FIG. 5 is a flowchart illustrating the content of the gamut mapping processing according to the embodiment.

FIG. 5 is a flowchart illustrating the content of the gamut mapping processing according to the embodiment. In step S510, the table generating unit 112 determines whether or not the image evaluation value E is equal to or greater than a predetermined threshold value Th set in advance. If the image evaluation value E is equal to or larger than the predetermined threshold value Th, the table generating unit 112 advances the processing to step S530, and when the image evaluation value E is smaller than the predetermined threshold value Th, the table generating unit 112 advances the processing to step S520.

In step S520, the table generating unit 112 executes first lightness adjustment processing. In the first lightness adjustment processing, the table generating unit 112 adjusts the values of the lightness L of the N grid points in the Lch color space based on the content of the histogram equalization processing. The first histogram equalization processing is also referred to as non-divided histogram equalization processing. As can be seen from the image evaluation value E, the histogram equalization processing (Histogram Equalization) is applied when the average value of the lightness L is relatively low and the standard deviation of the lightness L is large.

Figure 6A:
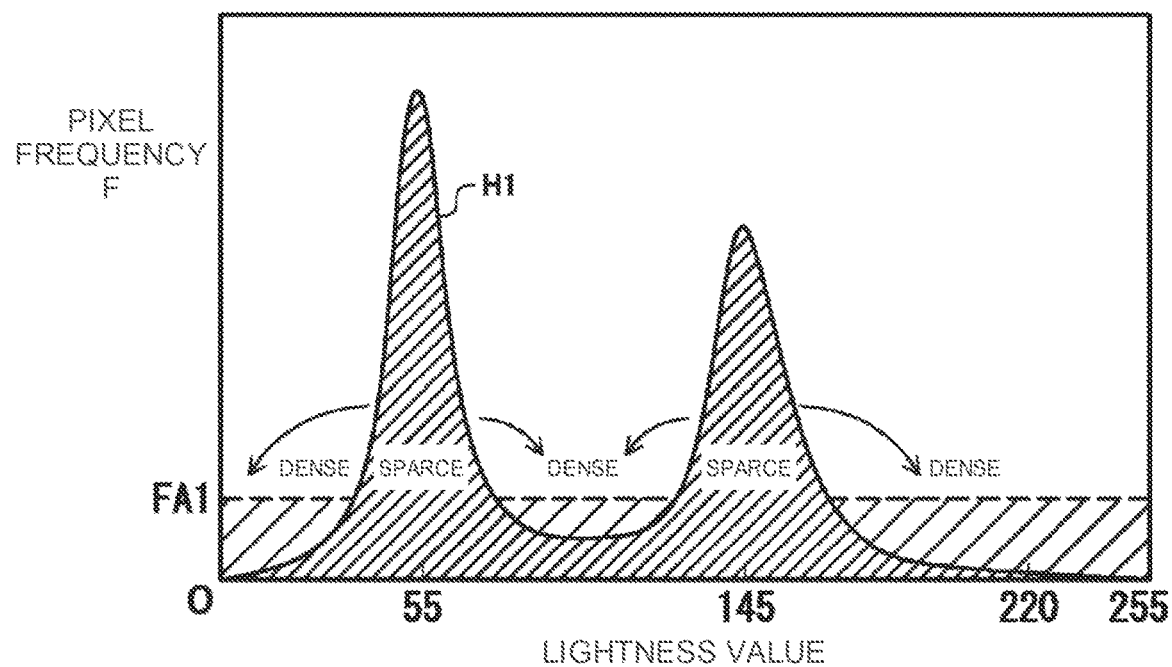
FIGS. 6A and 6B are an explanatory diagram illustrating the content of the histogram equalization processing according to the embodiment.
Figure 6B:
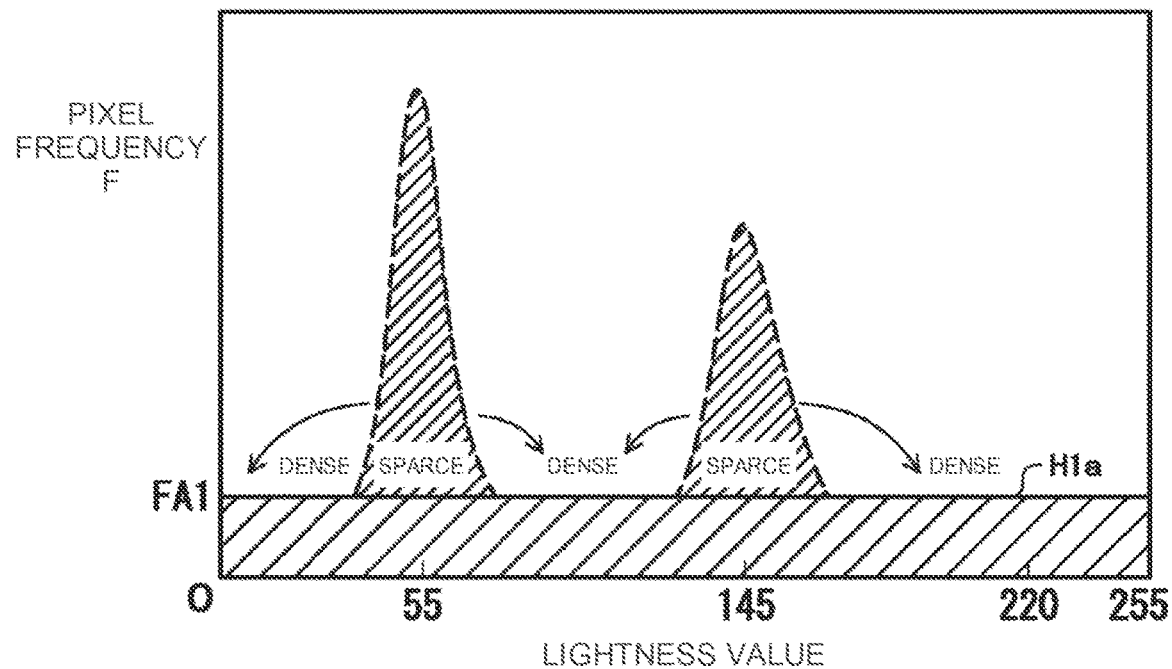

FIGS. 6A and 6B are an explanatory diagram illustrating the content of histogram equalization processing according to an embodiment. FIG. 6A illustrates a histogram H1 as an example of the Lch image before the histogram equalization processing. The vertical axis indicates the pixel frequency F (the number of pixels in the total number of pixels) of each gradation value, and the horizontal axis indicates the gradation value (0 to 255). Since the Lch image data has a plurality of large peaks, the standard deviation of the lightness L is large.

Further, the Lch image data has a relatively low average value of lightness L. The pixel frequency FA1 is also referred to as an average pixel frequency, and is a pixel frequency as an average value obtained by dividing the total number of pixels of the Lch image by 256 gradation values from 0 to 255. That is, the pixel frequency FA1 is the frequency of pixels when the number of pixels is uniform over 256 gradation values from 0 to 255.

FIG. 6B illustrates a histogram H1a of an example of the Lch image after the histogram equalization processing. Histogram equalization processing is processing in which in a gradation region in which a pixel frequency F is composed of a large gradation value, that is, in a gradation region in which the pixel frequency F is high, the gradation of the gradation region is finely adjusted.

To be specific, for example, since the pixel frequency of the lightness gradation value 55 is six times the average pixel frequency FA1, the table generating unit 112 divides one gradation before the histogram equalization processing (also simply referred to as before equalization processing) into six, and virtually assigns six gradations to one gradation before equalization processing. One sixth of a plurality of pixels corresponding to one gradation before equalization processing is allocated to the six gradations virtually allocated.

Thus, the pixel frequency in the vicinity of the lightness gradation value 55 becomes equal to the average pixel frequency F before the equalization processing. In this manner, the table generating unit 112 performs processing so as to reduce the pixel frequency and bring the pixel frequency close to the average pixel frequency FA1 by making the gradation finer in the gradation region in which the pixel frequency is larger than the average pixel frequency FA1.

On the other hand, for example, since the pixel frequency of the lightness gradation value 220 is 1/10 of the average pixel frequency FA1, the table generating unit 112 multiplies one gradation before the equalization processing by 10, and virtually assigns 0.1 gradation to one gradation before the equalization processing. A plurality of pixels corresponding to 10 gradations before equalization processing are allocated to one gradation virtually allocated. As a result, the pixel frequency in the vicinity of the lightness gradation value 220 becomes ten times as high as that before the equalization processing, and becomes equal to the average pixel frequency F. In this manner, the table generating unit 112 performs processing so as to increase the pixel frequency to approach the average pixel frequency FA1 by roughening the gradation in the gradation region in which the pixel frequency is smaller than the average pixel frequency FA1.

Finally, the table generating unit 112 can return the width of the gradation value set virtually finely to the width of the original gradation value, disperse the number of pixels in the gradation range with high pixel frequency to be sparse, reduce the pixel frequency to approach the average pixel frequency FA1, and aggregate the number of pixels in the gradation range with low pixel frequency to be dense, and increase the pixel frequency to approach the average pixel frequency FA1. Thus, the table generating unit 112 can increase the contrast of the Lch image data to improve the visibility. The table generating unit 112 can similarly adjust the gradation values of the lightness L of the N grid points in the gamut mapping.

In step S530, the table generating unit 112 executes the second lightness adjustment processing. In the second lightness adjustment processing, the table generating unit 112 adjusts the values of the lightness L of the N grid points in the Lch color space based on the content of the non-divided histogram equalization processing. The second histogram equalization processing is also referred to as divided histogram equalization processing. The divided histogram equalization processing (Bi-Histogram Equalization: BBHE) is applied to the case where the average value of the lightness L is relatively high and the standard deviation of the lightness L is small as can be seen from the image evaluation value E.

Figure 7A:
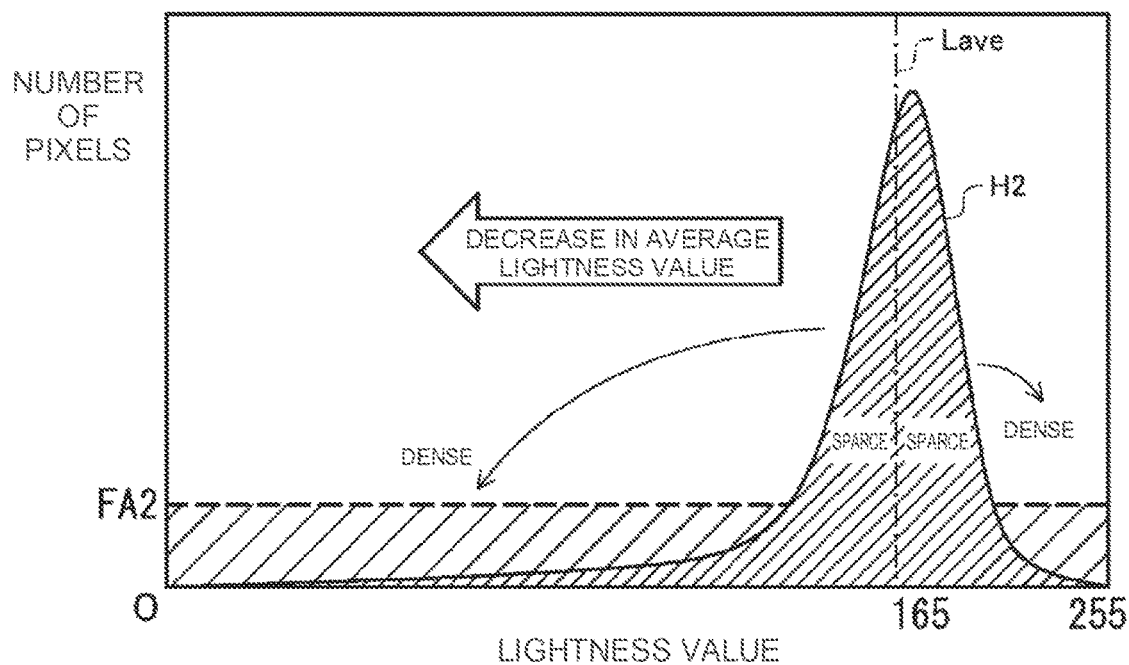
FIGS. 7A and 7B are an explanatory diagram illustrating the content of the divided histogram equalization processing according to the embodiment.
Figure 7B:
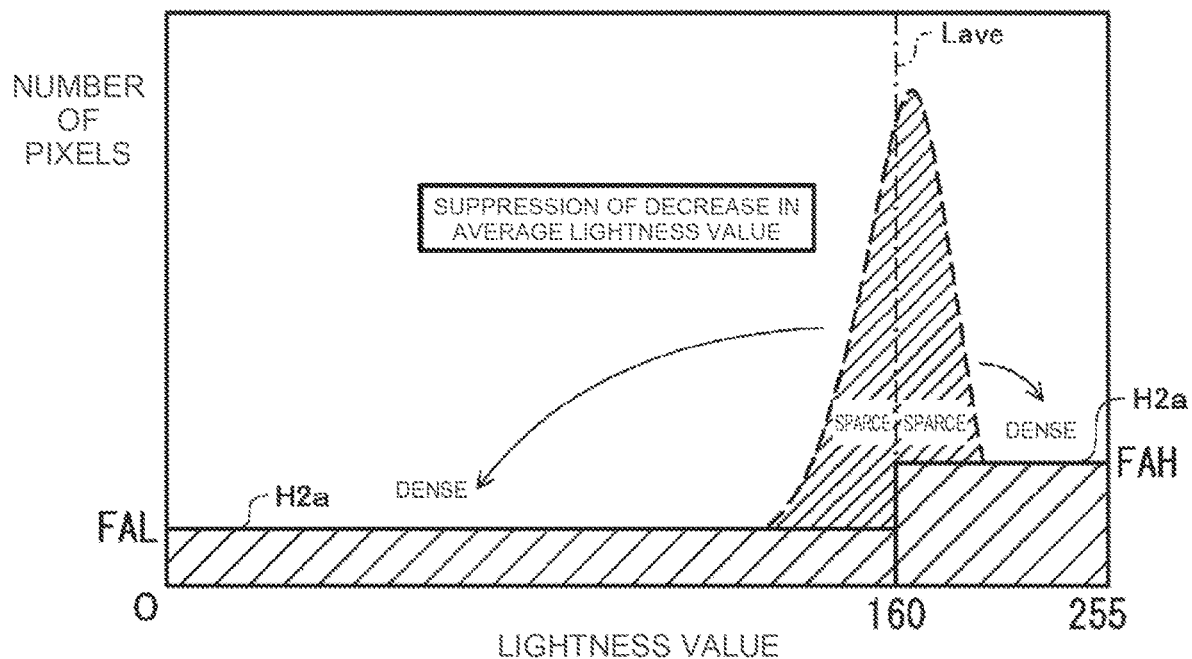

FIGS. 7A and 7B are an explanatory diagram illustrating the content of the divided histogram equalization processing according to the embodiment. FIG. 7A illustrates a histogram H2 as an example of the Lch image before the division histogram equalization processing. Since the Lch image data has a single large peak, the standard deviation of the lightness L is small. Further, since this Lch image data has a single large peak in a gradation region with high lightness L, it has an average lightness value Lave which is an average value of relatively high lightness L.

The pixel frequency FA2 is also referred to as an average pixel frequency, and is a pixel frequency as an average value obtained by dividing the total number of pixels of another Lch image by 256 gradation values from 0 to 255. The inventor of the present application has focused on the fact that when histogram equalization processing is performed on such Lch image data, pixels are dispersed in a dark gradation region with a low gradation value, and thus the average value of the lightness L decreases, resulting in an image that is dark as a whole, and thus there is a tendency to give the user an impression that visibility has deteriorated.

FIG. 7B illustrates a histogram H2a of an example of the Lch image after the division histogram equalization processing. The divided histogram equalization processing is processing in which the histogram is divided into a low-lightness gradation region in which the lightness L is lower than the average lightness value Lave and a high-lightness gradation region in which the lightness L is higher than the average lightness value Lave with reference to the average lightness value Lave, and the histogram equalization processing is independently executed in each divided gradation region.

According to the divided histogram equalization processing, the table generating unit 112 equalizes to the pixel frequency FAH higher than the pixel frequency FA2 in the high lightness gradation region and equalizes to the pixel frequency FAL lower than the pixel frequency FA2 in the low lightness gradation region. In this way, since the divided histogram equalization processing avoids the distribution of pixels across the average lightness value Lave and performs the equalization processing so as to have a higher pixel frequency in the high lightness gradation region than in the low lightness gradation region, it is possible to suppress a decrease in the average lightness value Lave. As a result, the table generating unit 112 can reduce the impression of deterioration in visibility due to a decrease in the average value of the lightness L.

As described above, the table generating unit 112 can select and execute appropriate processing for the input image, either the non-divided histogram equalization processing or the divided histogram equalization processing, according to the image evaluation value E representing the characteristics of the input image.

Figure 8:
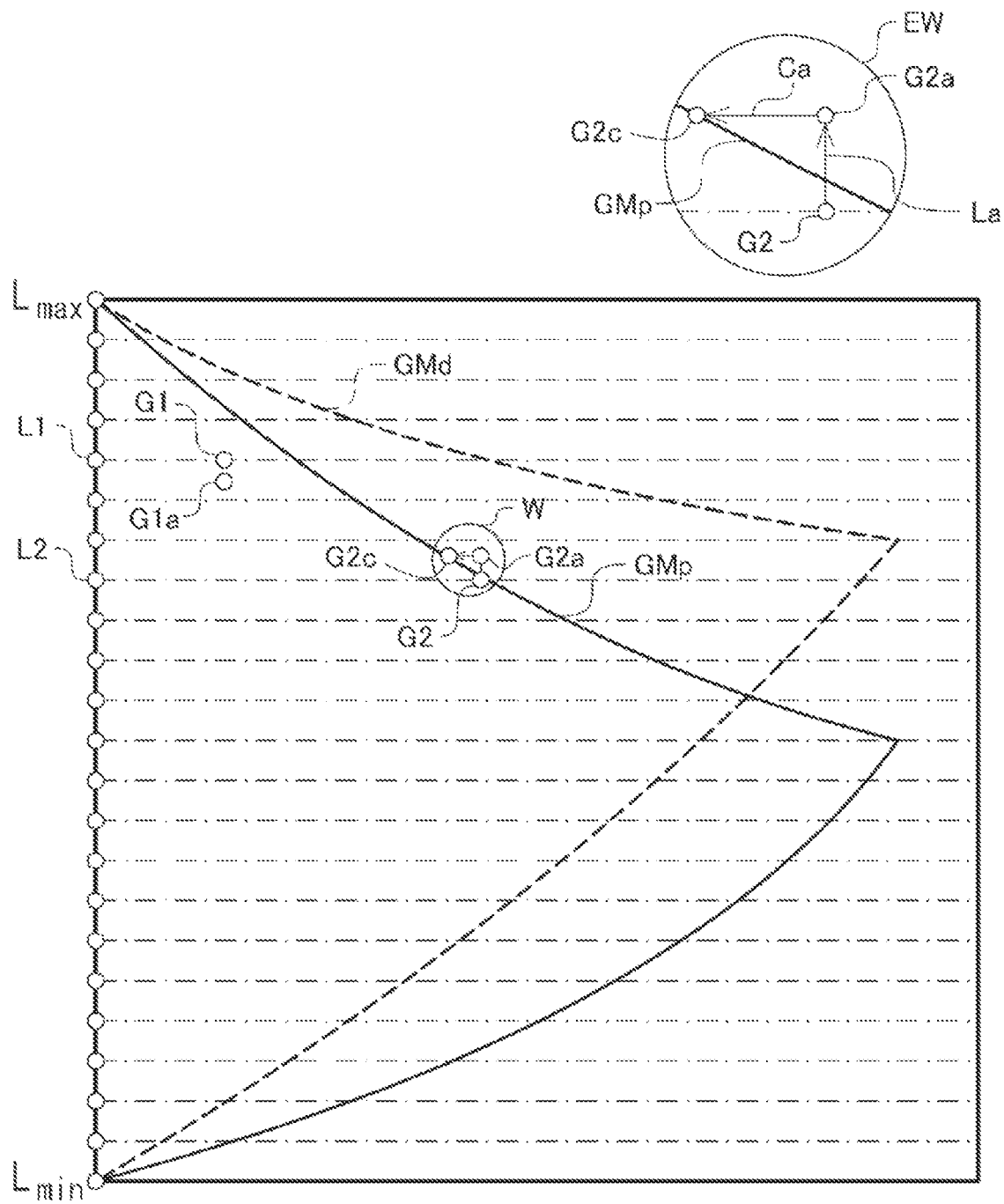
FIG. 8 is an explanatory diagram illustrating the content of the chroma adjustment processing according to the embodiment.

FIG. 8 is an explanatory content of the chroma adjustment processing according to the embodiment. In the chroma adjustment processing, the table generating unit 112 adjusts the chroma of N (N is a natural number) grid points of the standard color table 141 as necessary (step S540 to S570). In this example, two grid points G1 (lightness gradation value is lightness L1) and G2 (lightness gradation value is lightness L2) of the standard color table 141 will be described as an example. It is assumed that the two grid points G1 and G2 are adjusted to the grid points G1a and G2a by the first lightness adjustment processing or the second lightness adjustment processing, respectively. The grid points G1a and G2a are also referred to as lightness-adjusted grid points.

In step S540, the table generating unit 112 determines whether or not the lightness-adjusted grid point is within the range of the color gamut GMp (print gamut) reproducible by the image forming unit 120 using the CMYK color materials, based on the Lch value of the lightness-adjusted grid point after the lightness gradation value is adjusted. If the color of the lightness-adjusted grid point is not within the color gamut GMp, the table generating unit 112 advances the processing to step S560. If the color of the lightness-adjusted grid point is within the color gamut GMp, the table generating unit 112 advances the processing to step S550. Since the lightness-adjusted grid point G1a is within the range of the color gamut GMp, the table generating unit 112 advances the processing to step S550.

In step S550, the table generating unit 112 executes grid-data setting processing. In the grid-data setting processing, the table generating unit 112 also generates a color conversion table (RGB to L'ch) and a monitor profile based on the lightness-adjusted grid point G1a, and sets them as a part of the adjusted color table 142 (RGB to L'ch, L'ch to CMYK, and RGB to CMYK).

L'ch means that only the lightness L is adjusted (L to L'). In addition, the table generating unit 112 may determine whether or not the color gamut is within the range of the color gamut GMd (display gamut) reproducible by the operation display unit 230, and may execute the same processing for the monitor profile.

On the other hand, as illustrated in the window W and the enlarged window EW, in the grid point G2a after lightness adjustment, the grid point G2 in the range of the color gamut GMp (gamut) is adjusted by the lightness adjustment amount La by the first lightness adjustment processing or the second lightness adjustment processing, and is out of the range of the color gamut GMp. In this way, since the lightness-adjusted grid point G2a is outside the range of the color gamut GMp, the table generating unit 112 advances the processing to step S560.

In step S560, the table generating unit 112 executes chroma adjustment processing. In the chroma adjustment processing, the table generating unit 112 acquires the grid point G2c by adjusting the chroma of the lightness-adjusted grid point G2a by the chroma adjustment amount Ca. Thus, the grid point G2 is adjusted to the grid point G2c within the range of the color gamut GMp (gamut) via the grid point G2a after brightness adjustment.

In step S570, the table generating unit 112 executes a grid-data setting processing. In the grid-data setting processing, the table generating unit 112 also generates the color conversion table (RGB to L'c'h) and the monitor profile based on the data of the grid point G2c after the lightness and the chroma are adjusted, and sets them as a part of the adjusted color table 142 (RGB to L'c'h, L'c'h to CMYK and RGB to CMYK). Note that L' c' h means that the lightness L and the chroma are adjusted (L to L' and c to c').

Such chroma adjustment processing (steps S540 to S570) is repeatedly executed until processing of the final grid is completed and processing of all N grids is completed (step S580). As a result, the table generating unit 112 can set all the color conversion results within the color gamut GMp reproducible by the image forming unit 120 even after the histogram equalization processing.

In step S590, the table generating unit 112 stores the adjusted color table 142 (RGB to L'ch or the like, L'ch or the like to CMYK, and RGB to CMYK) in the storage unit 140 of the image forming apparatus 100. The table generating unit 112 further sets the color table including the monitor profile as a part of the printer driver for the adjusted color table 142 so that the adjusted color table 242 is installed in the personal computer 200.

In step S600 (see FIG. 3), the image forming unit 120 uses the adjusted color table 142 to color-convert the RGB image data ID into the CMYK image data. In step S700, the image forming unit 120 performs halftone processing on the CMYK image to generate print data as a CMYK halftone image. In step S800, the image forming unit 120 executes exposure processing based on the dot data to form dots of the color material on the print medium.

As described above, the image forming system 10 according to the embodiment can improve the reproducibility of the visibility in the reproduction of the print image in the image forming processing. The image forming system 10 executes the histogram equalization processing in the absolute color space passed through the color conversion, and therefore, the image forming system 10 is more efficient than a case where the image forming system 10 executes the histogram equalization processing in advance and performs printing particularly when a print job is generated. The image forming system 10 has a feature that the color space reproducible by the image forming unit 120 can be accurately and effectively made use of to the limit.

C. Modifications: The present invention can be implemented not only in the above-described embodiment but also in the following modifications.

Modification 1: In the above-described embodiment, the table generating unit is to calculate the image evaluation value E as a value obtained by dividing the average value of the lightness L by the standard deviation of the lightness L, select the non-divided histogram equalization processing when the image evaluation value E is less than the predetermined threshold value Th, and select the divided histogram equalization processing when the image evaluation value E is equal to or greater than the predetermined threshold value Th. However, the selection of the histogram equalization processing in the present invention is not limited to such a determination criterion.

The table generating unit may be to select the divided histogram equalization processing when the average value of the lightness L is equal to or greater than a predetermined threshold value Tha, and to select the non-divided histogram equalization processing when the average value of the lightness L is less than the predetermined threshold value Tha. The table generation unit may be to select the divided histogram equalization processing when the standard deviation of the lightness L is less than a predetermined threshold value Thb, and to select the non-divided histogram equalization processing when the standard deviation of the lightness L is equal to or greater than the predetermined threshold value Thb.

Modification 2: In the above-described embodiment, the Lch color space is adopted as the color space used for the color table. However, for example, a Lab color space may be adopted as long as it is a device-independent absolute color space having a gradation value of brightness. In the Lch color space, as in the above-described embodiment, a gradation value in which the lightness L represents brightness can be used. On the other hand, in the Lab color space, luminance can be used a gradation value representing brightness. Further, the standard deviation may be replaced with a value representing a variation in gradation value representing brightness, which may be, for example, a variance.

Modification 3: In the above-described embodiment, the image forming apparatus 100 functions as an image formation control apparatus and adjusts the output profile and the simulation profile (the look-up table (LUT) 242). However, the output profile and the simulation profile may be generated by the personal computer 200 functioning as the image formation control apparatus. The output profile and the simulation profile may be used in the personal computer 200, or may be provided to the image forming apparatus and used on the image forming apparatus side. In this example, the control unit 210 functions as an image formation control unit, an image analysis unit, and a table generating unit. The output profile and the simulation profile may be saved in association with the image data to be subjected to color conversion in consideration of reuse or distribution, and may be used as an attached file of the image data.

Modification 4: In the above-described embodiment, the CMYK inks are used, but the inks are not limited to CMYK, and may include a plurality of other color materials (for example, CMYKlclm, CMYK+Orange+Green, or the like) or special colors (spot colors or special colors). The present invention is applicable to printing in a reproduction color space reproducible by a plurality of color materials including a plurality of chromatic color materials and a black color material.

Modification 5: In the above-described embodiment, a configuration in which a print job is received from a personal computer and printed is exemplified, but the present invention is also applicable to copy processing.

What is claimed is:

1. An image formation control apparatus that controls an image forming apparatus to form an image on an image forming medium based on input image data using a plurality of color materials including a plurality of chromatic color materials, the image formation control apparatus comprising:
   a table generating unit to generate a visibility improvement color table for color-converting the input image data into intermediate image data that is image data in an absolute color space, performing histogram equalization processing on a brightness gradation value representing brightness of an image represented by the intermediate image data, adjusting a brightness gradation value representing brightness of the intermediate image data based on the performed histogram equalization processing, and color-converting the intermediate image data having the adjusted gradation value into color material gradation data having color material gradation values representing densities of the plurality of color materials in a reproduction color space reproducible by the plurality of color materials; and
   an image formation control unit to execute the color conversion using the generated color table and generate an image forming job for executing image forming on an image forming medium based on the color material gradation data.

2. The image formation control apparatus according to claim 1,
   wherein the table generating unit is capable of executing one of non-divided histogram equalization processing and divided histogram equalization processing as the histogram equalization processing,
   executes the divided histogram equalization processing when an average value of brightness gradation values of the intermediate image data is equal to or greater than a predetermined threshold value set in advance,
   and executes the non-divided histogram equalization processing when the average value of brightness gradation values of the intermediate image data is less than the predetermined threshold value.

3. The image formation control apparatus according to claim 1,
   wherein the table generating unit is capable of executing one of non-divided histogram equalization processing and divided histogram equalization processing as the histogram equalization processing,
   executes the divided histogram equalization processing when a value representing variation in brightness gradation values of the intermediate image data is less than a predetermined threshold value set in advance,
   and executes the non-divided histogram equalization processing when the value representing variation in brightness gradation values of the intermediate image data is equal to or greater than the predetermined threshold value.

4. The image formation control apparatus according to claim 1,
   wherein the table generating unit is capable of executing one of non-divided histogram equalization processing and divided histogram equalization processing as the histogram equalization processing,
   executes the divided histogram equalization processing when an image evaluation value, which is a value obtained by dividing an average value of brightness gradation values of the intermediate image data by a value representing variation in the brightness gradation values of the intermediate image data, is equal to or greater than a predetermined threshold,
   and executes the non-divided histogram equalization processing when the image evaluation value is less than the predetermined threshold.

5. The image formation control apparatus according to claim 1,
   further comprising an operation display unit to receive a user input for using the visibility improvement color table,
   wherein the table generating unit includes a standard color table used in common regardless of content of the input image data,
   and generates the visibility improvement color table by adjusting brightness gradation values of a plurality of grids included in the standard color table based on the histogram equalization processing in response to the reception of the user input, determining whether chroma of the adjusted grids is within the reproduction color space, and adjusting chroma of the adjusted grids to be within the reproduction color space when it is determined that chroma of the adjusted grids is not within the reproduction color space.

6. The image formation control apparatus according to claim 1,
- wherein the table generating unit uses an Lch color space or a Lab color space as a color space of the intermediate image data,
- uses lightness of the Lch color space or luminance of the Lab color space as the brightness gradation value,
- and generates a color table for converting the Lch color space or the Lab color space into the image data of the reproduction color space as the visibility improvement color table.

7. An image formation control method that controls an image forming apparatus to form an image on an image forming medium based on input image data using a plurality of color materials including a plurality of chromatic color materials, the image formation control method comprising:
- table generation of generating a visibility improvement color table for color-converting the input image data into intermediate image data that is image data in an absolute color space, performing histogram equalization processing on a brightness gradation value representing brightness of an image represented by the intermediate image data, adjusting a brightness gradation value representing brightness of the intermediate image data based on the performed histogram equalization processing, and color-converting the intermediate image data having the adjusted gradation value into color material gradation data having color material gradation values representing densities of the plurality of color materials in a reproduction color space reproducible by the plurality of color materials; and
- image formation control of executing the color conversion using the generated color table and generating an image forming job for executing image forming on an image forming medium based on the color material gradation data.

8. A non-transitory computer-readable storage medium storing an image formation control program to control an image formation control apparatus that controls an image forming apparatus to form an image on an image forming medium based on input image data using a plurality of color materials including a plurality of chromatic color materials, the image formation control program causing the image formation control apparatus to function as:
- a table generating unit to generate a visibility improvement color table for color-converting the input image data into intermediate image data that is image data in an absolute color space, performing histogram equalization processing on a brightness gradation value representing brightness of an image represented by the intermediate image data, adjusting a brightness gradation value representing brightness of the intermediate image data based on the performed histogram equalization processing, and color-converting the intermediate image data having the adjusted gradation value into color material gradation data having color material gradation values representing densities of the plurality of color materials in a reproduction color space reproducible by the plurality of color materials; and
- an image formation control unit to execute the color conversion using the generated color table and generate an image forming job for executing image forming on an image forming medium based on the color material gradation data.

* * * * *